(12) United States Patent
Bullock et al.

(10) Patent No.: US 12,007,314 B1
(45) Date of Patent: Jun. 11, 2024

(54) PROBE ASSEMBLY FOR SAMPLING FLUIDS FROM A PIPE OR CONDUIT

(71) Applicant: Chemtec Energy Services, LLC, Willis, TX (US)

(72) Inventors: Zane Bullock, Willis, TX (US); Josh Gober, Willis, TX (US); Shawn Laughlin, Willis, TX (US)

(73) Assignee: Chemtec Energy Services, LLC, Willis, TX (US)

( * ) Notice: Subject to any disclaimer, the term of this patent is extended or adjusted under 35 U.S.C. 154(b) by 0 days.

(21) Appl. No.: 17/881,324

(22) Filed: Aug. 4, 2022

Related U.S. Application Data

(60) Provisional application No. 63/229,771, filed on Aug. 5, 2021.

(51) Int. Cl.
  *G01N 1/20*  (2006.01)
(52) U.S. Cl.
  CPC ... *G01N 1/2035* (2013.01); *G01N 2001/2064* (2013.01)
(58) Field of Classification Search
  CPC ............ G01N 1/2035; G01N 2001/2064
  USPC ............ 73/863.03, 863.51, 863.81, 863.85, 73/864.73
  See application file for complete search history.

(56) References Cited

U.S. PATENT DOCUMENTS

| | | | | | |
|---|---|---|---|---|---|
| 3,625,065 | A | * | 12/1971 | Thompson | G01N 1/2035 73/863.61 |
| 3,765,226 | A | * | 10/1973 | Strickland | G01N 1/2035 73/863.61 |
| 3,803,921 | A | * | 4/1974 | Dieterich | G01F 1/46 73/863.61 |

* cited by examiner

*Primary Examiner* — Robert R Raevis
(74) *Attorney, Agent, or Firm* — Paul D. Bangor, Jr., Esq.; Clark Hill PLC (57) ABSTRACT

A probe assembly for providing a flow of a fluid from a pipeline into a sample transport line or slipstream, comprising: an outer tubular probe tip attached to a distal end of an outer tube mid-section; wherein the outer tubular probe tip has an outer opening; a connection head having an outer tube attached to a proximal end of an outer tube mid-section; wherein the outer tubular probe tip, the outer tube mid-section, and the outer tube are of a first inner diameter; wherein the outer opening of the outer tubular probe tip receives a flow of the fluid from within the pipeline that travels through the outer probe tip, the outer tube mid-section, the outer tube and connection head into the sample transport line or slipstream; a return tube, having an outer diameter smaller than the first inner diameter, disposed through the center of each of the outer tubular probe tip, the outer tube mid-section, the outer tube and the connection head; a first connection fitting for connecting return tubing to connection head; and a second connection fitting for connecting return tubing to the sample transport line or slipstream.

15 Claims, 8 Drawing Sheets

PROBE ASSEMBLY FOR SAMPLING FLUIDS FROM A PIPE OR CONDUIT

This application claims priority benefit under 35 U.S.C. § 119(e) of U.S. Provisional Application No. 63/229,771 filed Aug. 5, 2021 the contents of which are herein incorporated by reference.

FIELD OF THE DISCLOSURE

Technical Field

The present disclosure generally relates to the field of probe assemblies for sampling fluids from a pipe or conduit.

Background of the Disclosure

Known probe assemblies are mechanical devices inserted into a pipeline, API Loop, or any other flowing line in order to provide a mechanical means for flow. This flow is representative of the actual product flowing by in the pipe to produce a sample transport line or slipstream in order to utilize a sample device, densitometer, or any other analytical instrument used to qualitatively and/or quantitatively analyze samples or the chemical makeup of a sample and the quantity of each component within a sample. Prior probe devices suffered from dead-legs, a design flaw that plagued the previously used single probes. Such widely used known single probes do not allow product to have isokinetic flow to the sampler or analytical instrument which impedes representative sampling recommended by API Section 8.2—Standard Practice for Automatic Sampling of Petroleum and Petroleum Products. Isokinetic sampling means sampling in which the linear velocity of the fluid entering the sampling probe is equal to that of the undisturbed fluid stream at the sample point. To overcome the shortcomings of prior probe assemblies, the present disclosure pertains to an improved sampling probe assembly for insertion into a pipeline, API Loop, or the like that provides for isokinetic flow through the probe, as well as other advantages as set forth below in the Detailed Description.

BRIEF SUMMARY OF THE DISCLOSURE

In a preferred aspect, the present disclosure comprises a probe assembly for providing a flow of a fluid from a pipeline into a sample transport line or slipstream, comprising: an outer tubular probe tip attached to a distal end of an outer tube mid-section; wherein the outer tubular probe tip has an outer opening; a connection head having an outer tube attached to a proximal end of an outer tube mid-section; wherein the outer tubular probe tip, the outer tube mid-section, and the outer tube are of a first inner diameter; wherein the outer opening of the outer tubular probe tip receives a flow of the fluid from within the pipeline that travels through the outer probe tip, the outer tube mid-section, the outer tube and connection head into the sample transport line or slipstream; a return tube, having an outer diameter smaller than the first inner diameter, disposed through the center of each of the outer tubular probe tip, the outer tube mid-section, the outer tube and the connection head; a first connection fitting for connecting return tubing to connection head; and a second connection fitting for connecting return tubing to the sample transport line or slipstream.

In another preferred aspect of a probe assembly of the present disclosure, the outer opening has a chamfered or beveled circumference designed and configured to introduce isokinetic flow through the outer tubular probe tip.

In yet another preferred aspect of a probe assembly of the present disclosure, the outer opening has a chamfered or beveled circumference designed and configured to introduce isokinetic flow through the outer tubular probe tip, the outer tube mid-section and the outer tube.

In another preferred aspect of a probe assembly of the present disclosure, the connection head is made by machining.

In an additional preferred aspect of a probe assembly of the present disclosure, upon installation on pipeline, the outer tubular probe tip is located at or near the center of an inner diameter of the pipeline.

In another preferred aspect of a probe assembly of the present disclosure, upon installation on pipeline, the outer tubular probe tip is located at or near the center of an inner diameter of the pipeline with outer opening facing upstream with respect to a direction of fluid flow within the pipeline.

In a further preferred aspect of a probe assembly of the present disclosure, the outer tube of connection head is welded to the proximal end of outer tube mid-section and the outer tubular probe tip, is welded to a distal end of the outer tube mid-section.

In another preferred aspect of a probe assembly of the present disclosure, the first inner diameter is about 1.5 inches and the return tube has an inner diameter of about 0.75 inches.

In yet another preferred aspect of a probe assembly of the present disclosure, the first inner diameter is about 1 inch and the return tube has an inner diameter of about 0.5 inches.

In a further preferred aspect of a probe assembly of the present disclosure, the first inner diameter is about 0.75 inches and the return tube has an inner diameter of about 0.5 inches.

In another preferred aspect of a probe assembly of the present disclosure, the connection head is attached to the pipeline by a threaded or flanged connector.

In an additional preferred aspect of a probe assembly of the present disclosure, the return tube has a return opening facing downstream with respect to a direction of fluid flow within the pipeline.

In another preferred aspect of a probe assembly of the present disclosure, the outer opening of probe tip has a radius at the top and bottom and is generally stadium-shaped.

In yet another preferred aspect of a probe assembly of the present disclosure, the outer opening is sized as follows: 1.5" Outer Tubing inside diameter: the outer opening is preferably 1.232" wide×1.607" long; 1" Outer Tubing inside diameter: the outer opening is preferably 0.870" wide× 1.120" long; and ¾" Outer Tubing inside diameter: the outer opening is preferably 0.625" wide×0.875" long.

In a further preferred aspect of a probe assembly of the present disclosure, the return opening is ellipse-shaped and sized as follows: ¾" Inner Tubing inside diameter: the return opening is preferably 0.602" wide×0.891" long; ½" Inner Tubing inside diameter: the return opening is preferably 0.402" wide×0.574" long; and ⅜" Inner Tubing inside diameter: the return opening is preferably 0.277" wide× 0.396" long.

DETAILED DESCRIPTION

In the following "Detailed Description" of the present disclosure, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "disclosure" merely for convenience and without intending to voluntarily limit the scope of this application to any single inventive concept if more than one is in fact disclosed.

The following Detailed Description is, therefore, not to be taken in a limited sense, and the scope of the inventive subject matter is defined by the appended claims and their equivalents.

As shown in FIGS. 1-7 and 9, the present disclosure is directed to a probe assembly 10 for inserting into a pipeline, such as an API Loop, or any other flowing pipe, line or conduit 30 in order to provide a mechanical means for producing flow of the actual fluid product from said main pipe or line 30 into a sample transport line or slipstream 50 in order to utilize a sample device, densitometer, or any other analytical instrument 60 used to qualitatively and/or quantitatively analyze samples or the chemical makeup of a sample and the quantity of each component within a sample.

The probe assembly 10 of the present disclosure comprises a machined outer probe tip 12 having an outer opening 13 with a chamfered or beveled circumference 13A designed and configured to introduce isokinetic flow through the outer probe tip 12 and through the distal end 19 outer tube mid-section 17 welded to outer probe tip 12. Such construction allows outer probe tip 12 to be located in the middle portion of the main line 30.

Figure 1:
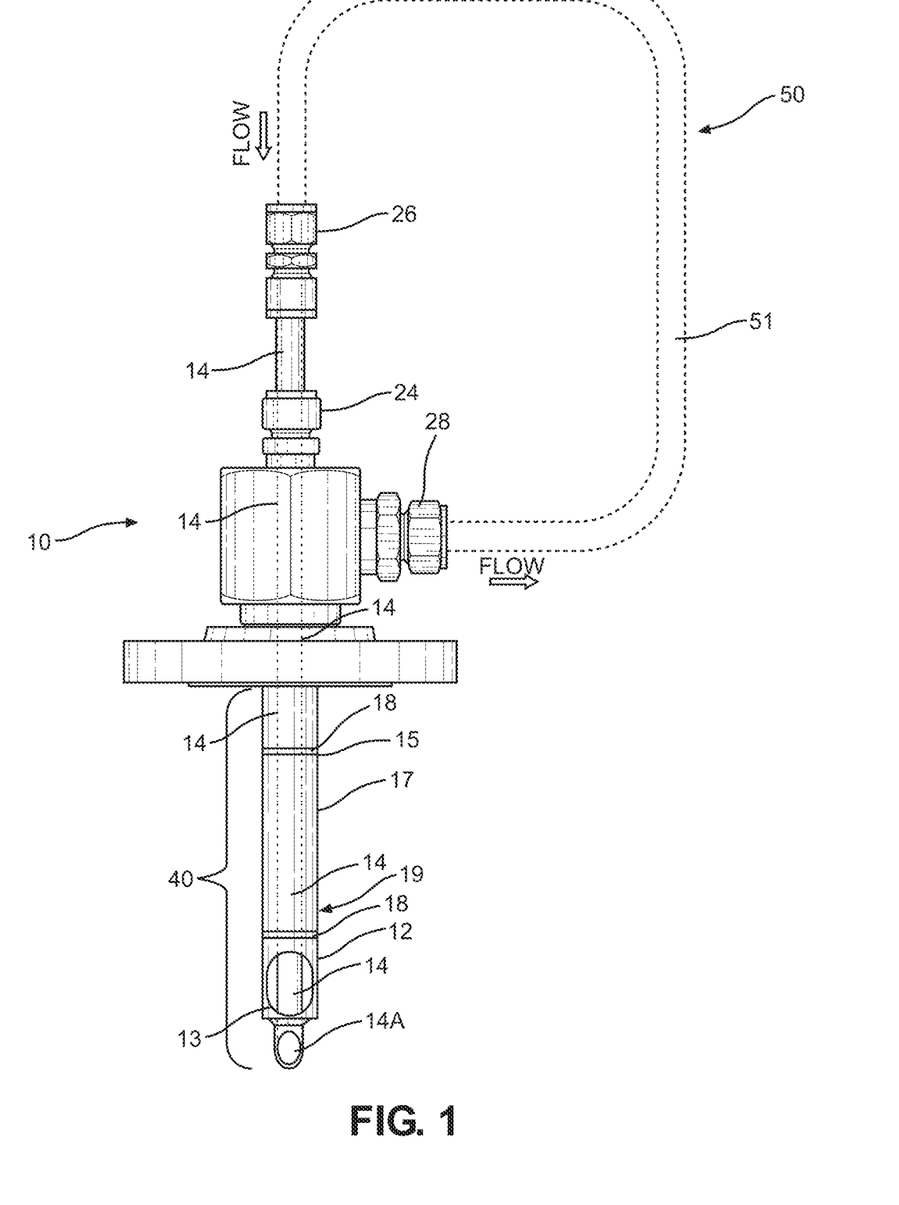
FIG. 1 shows an elevational view of a preferred probe assembly of the present disclosure.
Figure 6:
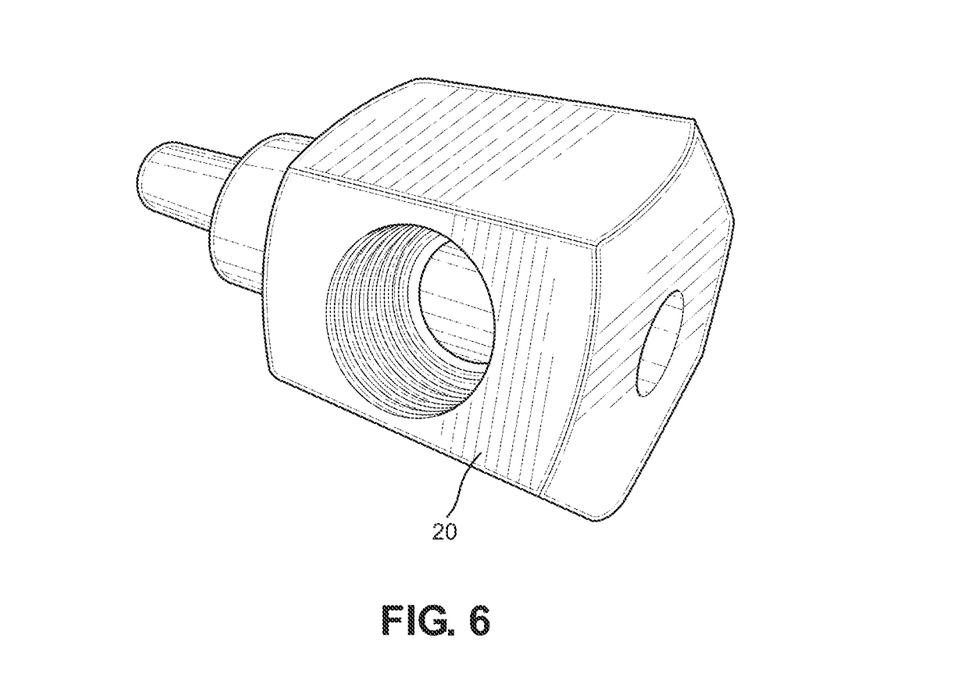
FIG. 6 shows a perspective view of a preferred machined connection head for a preferred probe assembly of the present disclosure.

A machined connection head 20 having an outer tube 21 is welded to the proximal end 15 of outer mid-section 17. Preferably, machined connection head 20 is attached to main flowing line or pipe 30 via a threaded or flanged connector 22. A smaller diameter return tube 14 preferably runs through the center of each of the outer probe tip 12, outer tube mid-section 17, machined connection head 20, outer tube 21, connection 24 for connecting return tubing 14 to head 20 and connection 26 for connecting return tubing 14 to slipstream 50 as shown in FIG. 1. According to the present disclosure sample transport line or slipstream 50 is created by connecting the outlet 28 of the machined connection head 20 to the return tubing 14 with piping 51 and other tubing, equipment, and compression/pipe fittings as required.

Preferably, the construction of probe assembly 10 utilizes no welds on return tubing 14 outside of pipe 30 to connect the return tubing 14 to sample transport line or slipstream 50. All welds 18 used in probe assembly 10 are inside the pipe 30 when probe assembly 10 is properly installed onto pipe 30. Welds 18 preferably are verified through Wake Frequency and Critical Velocity Calculations to be sufficient for the service they are to be installed in based on pressure, flow, viscosity, and product density.

Preferably, the probe assembly 10 of the present disclosure has no moving pieces allowing for an extended life of slip stream delivery and return.

Preferably, the length of the interior portion 40 of probe assembly 10 extended inside of pipe 30 places probe tip 12, at or near the center of the interior of pipe 30.

Figure 2:
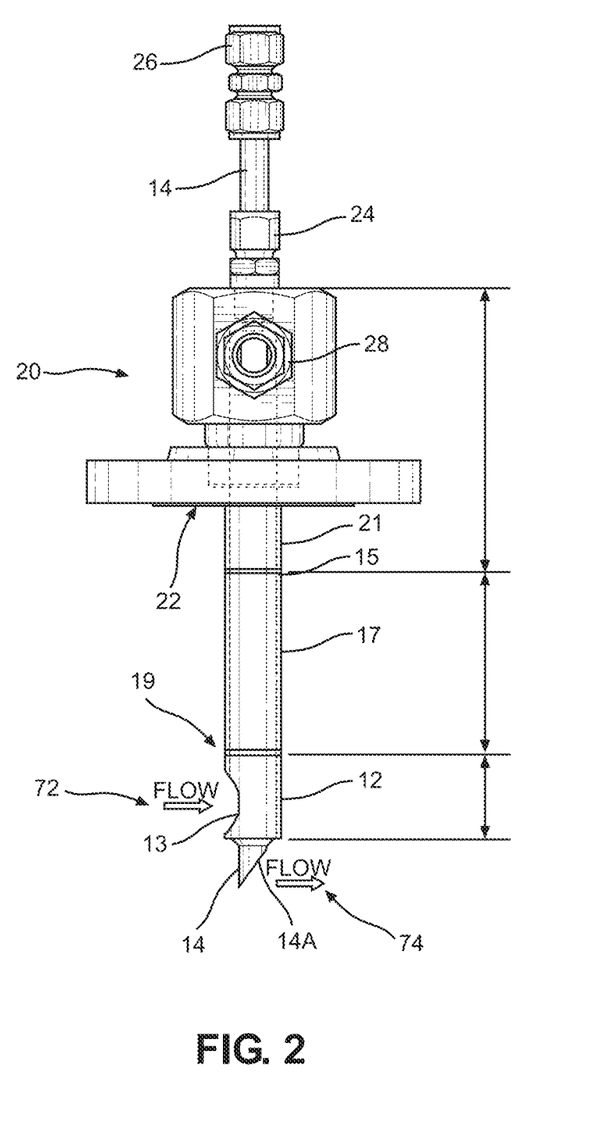
FIG. 2 shows another elevational view of a preferred probe assembly of the present disclosure.
Figure 3:
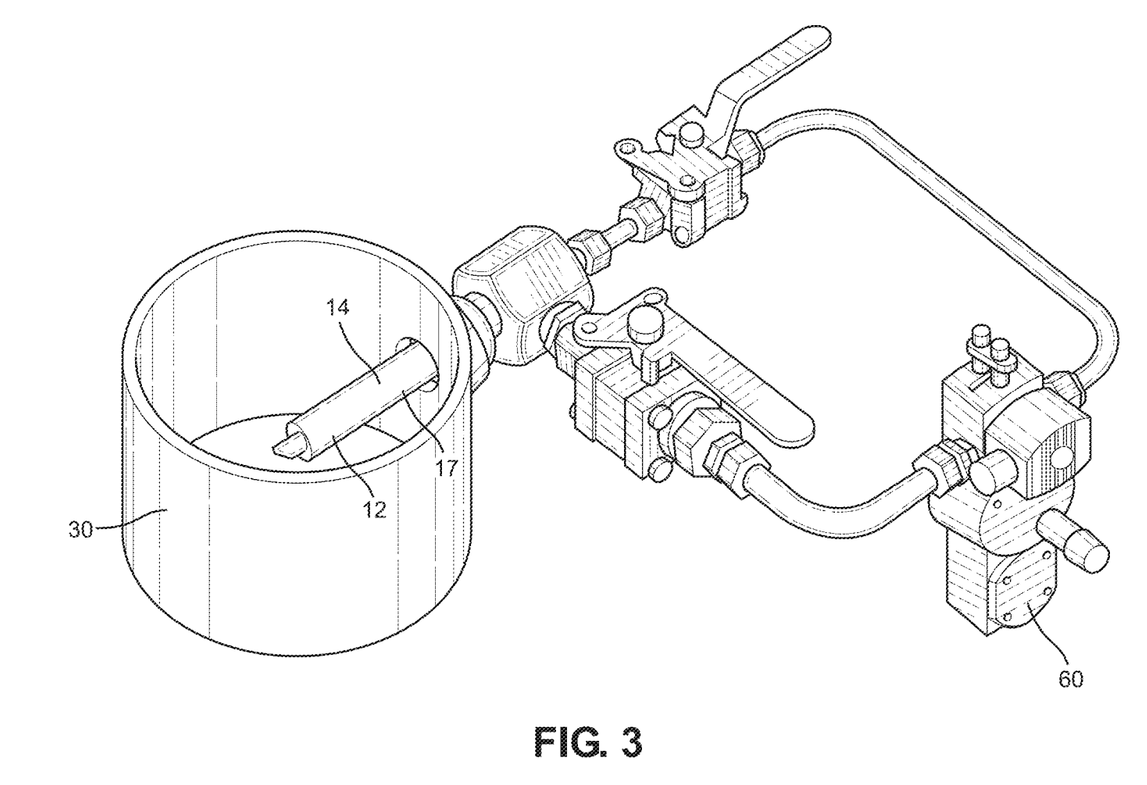
FIG. 3 shows a top perspective view of a preferred probe assembly of the present disclosure.
Figure 4:
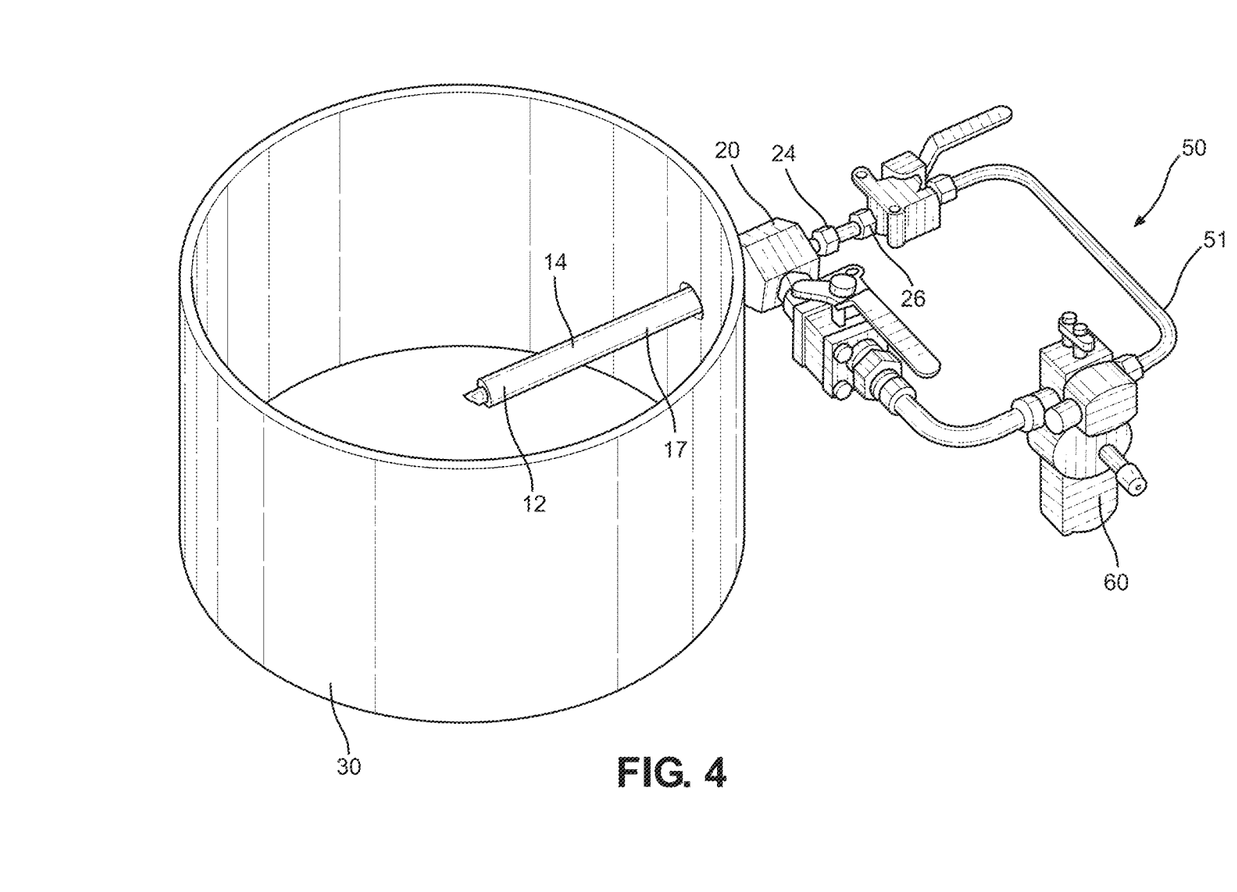
FIG. 4 shows another top perspective view of a preferred probe assembly of the present disclosure.
Figure 5:
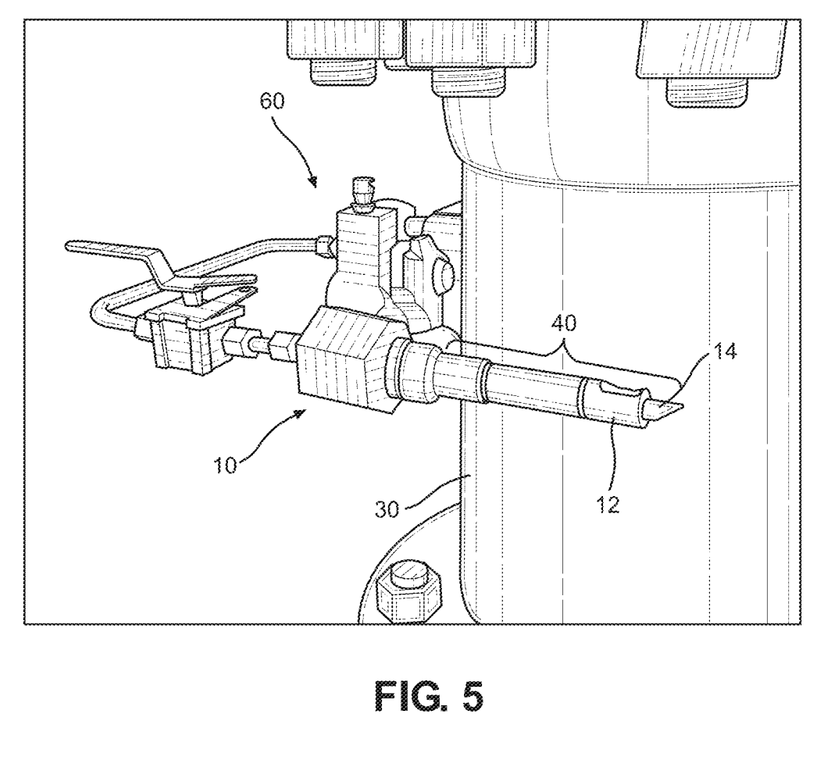
FIG. 5 shows yet another perspective view of a preferred probe assembly of the present disclosure.
Figure 8:
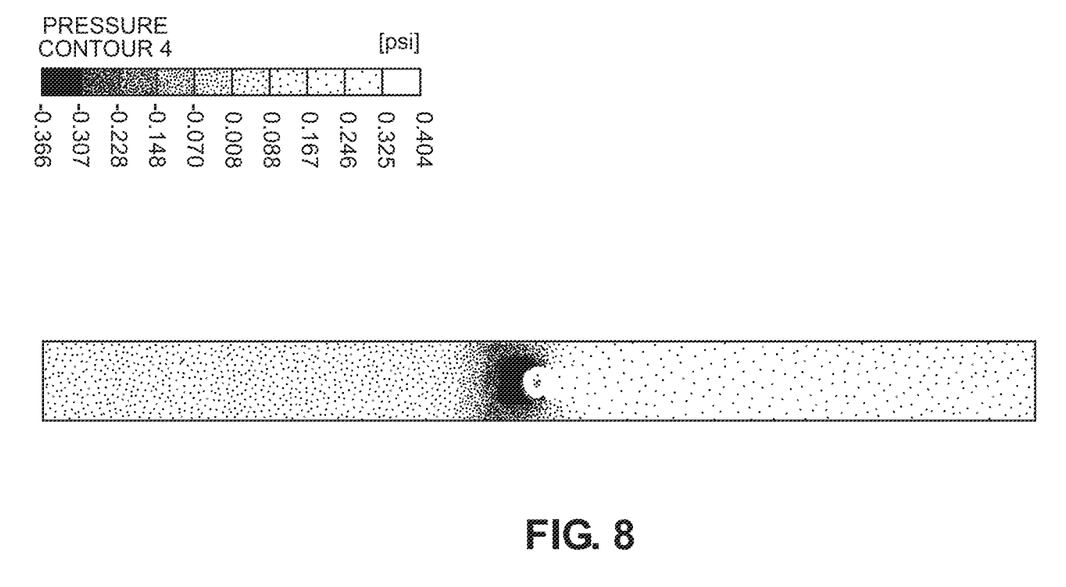
FIG. 8 is a schematic showing relative pressure readings within a preferred probe assembly of the present disclosure during operation.
Figure 9:
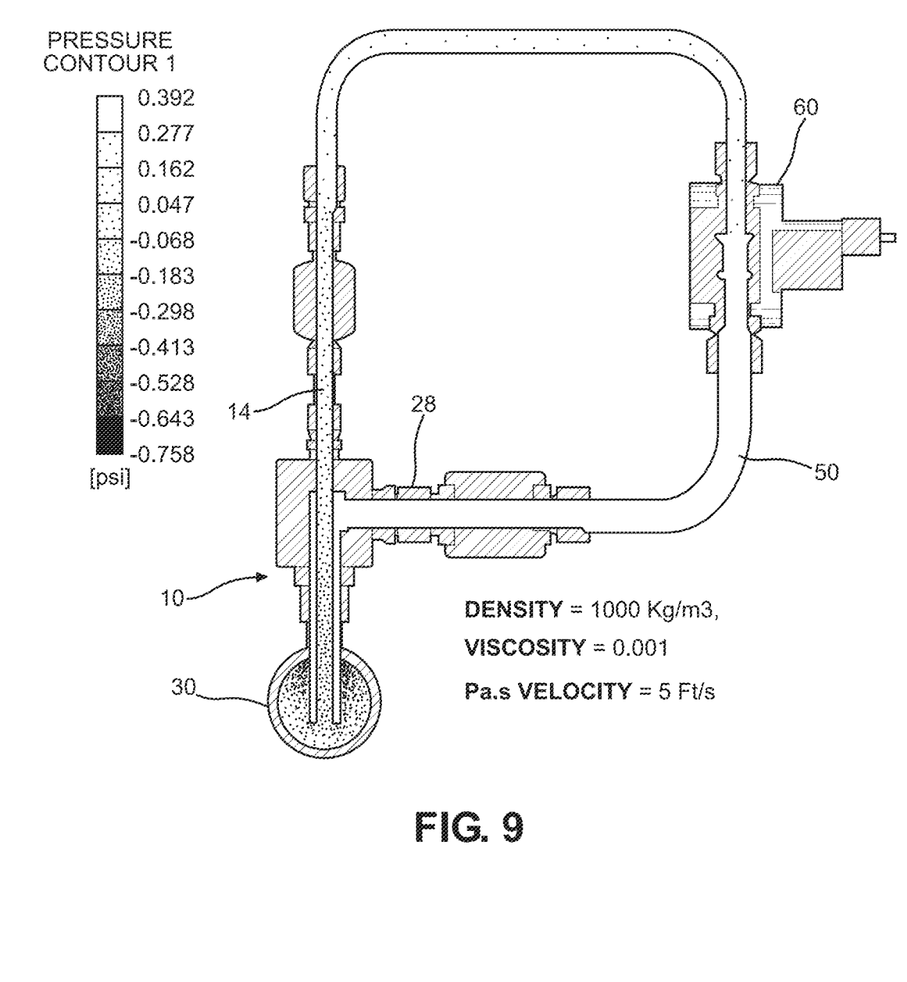
FIG. 9 is another schematic showing relative pressure readings within a preferred probe assembly of the present disclosure during operation.

According to the probe assembly 10 of the present disclosure, return tubing 14 preferably reintroduces the fluid back into the flow in main pipe 30 in such manner as to create a venturi effect at the probe tip 12. This results in a higher-pressure area on the upstream side 72 of the probe tip and a low pressure area 74 on the downstream side 74 of probe tip 12 as shown in FIG. 2 and also shown schematically in FIGS. 8 and 9. Preferably, as fluid is forced into the larger inlet 13 facing upstream, the low-pressure pocket created downstream at 74 pulls the return flow out of return opening 14A facing downstream of return pipe 14. Such design, along with the other features and components of probe assembly 10, provides improved flow and eliminates dead-legs, a design flaw that plagued the previously used single probes. These widely used single probes do not allow product to have isokinetic flow to the sampler/analytical instrument 60 which impedes representative sampling recommended by *API Section 8.2—Standard Practice for Automatic Sampling of Petroleum and Petroleum Products*. In most cases, probe assembly 10 is a direct replacement for these outdated single probes.

Preferably, Computational Fluid Dynamics (CFD) models may be created for each size range of probe assembly 10 to ensure preferred design attributes for probe assembly 10 are achieved in terms of and/or with respect to pressure, flow, density, viscosity, wake frequency and/or structural rigidity.

Preferably, probe assembly 10 comes in 3 sizes and are selected based on the size of pipe 30, the length of the interior portion 40 of probe assembly 10 extended inside of pipe 30, viscosity and flow rates of fluid flowing through pipe 30. Three preferred sizes for the "Outer Tubing" making up outer probe tip 12, proximal end 15, mid-section 17, outer tube 21 and the "Inner Tubing" used for return tubing 14 of probe assembly 10 are:

1.5" Outer Tubing inside diameter×¾" Timer Tubing inside diameter for 20" through 42" Nominal Pipe Size (NPS) of pipe 30;

1" Outer Tubing inside diameter×½" Inner Tubing inside diameter for 8" through 20" Nominal Pipe Size (NPS) of pipe 30;

¾ " Outer Tubing inside diameter×⅜" Inner Tubing inside diameter for 2" through 8" Nominal Pipe Size (NPS) of pipe 30;

Preferably, the sizes of machined connection head 20, connection 24, connection 26 and outlet 28 will vary as needed to accommodate the preferred sizes of the Inner Tubing and Outer Tubing set forth above.

Figure 7:
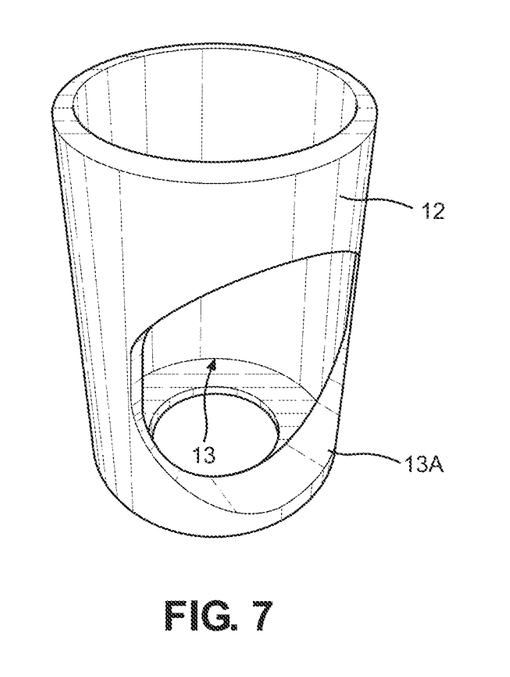
FIG. 7 shows a perspective view of a preferred machined outer probe tip for a preferred probe assembly of the present disclosure.

Preferably, outer opening 13 of probe tip 12 has a radius at the top and bottom and is generally stadium-shaped. Also, preferably, outer opening 13 is sized as follows:

1.5" Outer Tubing inside diameter: outer opening 13 is preferably 1.232" wide×1.607" long;

1" Outer Tubing inside diameter: outer opening 13 is preferably 0.870" wide×1.120" long; and ¾" Outer Tubing inside diameter: outer opening 13 is preferably 0.625" wide×0.875" long.

Preferably, return tubing 14 is cut at an angle to provide an ellipse-shaped return opening 14A that is the following sizes for each probe size:

¾" Inner Tubing inside diameter: return opening 14A is preferably 0.602" wide×0.891" long;

½" Inner Tubing inside diameter: return opening 14A is preferably 0.402" wide×0.574" long; and ⅜" Inner Tubing inside diameter: return opening 14A is preferably 0.277" wide×0.396" long.

In the foregoing Detailed Description, various features are grouped together in a single embodiment to streamline the disclosure. This method of disclosure is not to be interpreted as reflecting an intention that the claimed embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A probe assembly for providing a flow of a fluid from a pipeline into a sample transport line or slipstream, comprising:
   an outer tubular probe tip attached to a distal end of an outer tube mid-section; wherein the outer tubular probe tip has an outer opening;
   a connection head having an outer tube attached to a proximal end of the outer tube mid-section; wherein the outer tubular probe tip, the outer tube mid-section, and the outer tube are of a first inner diameter;
   wherein the outer opening of the outer tubular probe tip receives a flow of the fluid from within the pipeline that travels through the outer probe tip, the outer tube mid-section, and the connection head having the outer tube into the sample transport line or slipstream;
   a return tube, having an outer diameter smaller than the first inner diameter, disposed through the center of each of the outer tubular probe tip, the outer tube mid-section, and the connection head having the outer tube;
   a first connection fitting for connecting the return tube to connection head; and
   a second connection fitting for connecting the return tube to the sample transport line or slipstream.

2. The probe assembly of claim 1, wherein the outer opening has a chamfered or beveled circumference to introduce isokinetic flow through the outer tubular probe tip.

3. The probe assembly of claim 1, wherein the outer opening has a chamfered or beveled circumference to introduce isokinetic flow through the outer tubular probe tip, the outer tube mid-section and the outer tube.

4. The probe assembly of claim 1, wherein the connection head is made by machining.

5. The probe assembly of claim 1, wherein upon installation on pipeline, the outer tubular probe tip is located at or near the center of an inner diameter of the pipeline.

6. The probe assembly of claim 1, wherein upon installation on pipeline, the outer tubular probe tip is located at or near the center of an inner diameter of the pipeline with outer opening facing upstream with respect to a direction of fluid flow within the pipeline.

7. The probe assembly of claim 1, wherein the outer tube of connection head is welded to the proximal end of outer tube mid-section; and the outer tubular probe tip is welded to a distal end of the outer tube mid-section.

8. The probe assembly of claim 1, wherein the first inner diameter is about 1.5 inches and the return tube has an inner diameter of about 0.75 inches.

9. The probe assembly of claim 1, wherein the first inner diameter is about 1 inch and the return tube has an inner diameter of about 0.5 inches.

10. The probe assembly of claim 1, wherein the first inner diameter is about 0.75 inches and the return tube has an inner diameter of about 0.5 inches.

11. The probe assembly of claim 1, wherein the connection head is attached to the pipeline by a threaded or flanged connector.

12. The probe assembly of claim 1, wherein the return tube has a return opening facing downstream with respect to a direction of fluid flow within the pipeline.

13. The probe assembly of claim 1, wherein the outer opening of probe tip has a radius at the top and bottom and is generally ellipse-shaped.

14. The probe assembly of claim 1, wherein the outer opening is sized as follows:
   1.5" Outer Tubing inside diameter: the outer opening is about 1.232" wide×1.607" long;
   1" Outer Tubing inside diameter: the outer opening is about 0.870" wide×1.120" long; or
   ¾" Outer Tubing inside diameter: the outer opening is about 0.625" wide×0.875" long.

15. The probe assembly of claim 12, wherein the return opening is ellipse-shaped and sized as follows:
   ¾" Inner Tubing inside diameter: the return opening is about 0.602" wide×0.891" long;
   ½" Inner Tubing inside diameter: the return opening is about 0.402" wide×0.574" long; or
   ⅜" Inner Tubing inside diameter: the return opening is about 0.277" wide×0.396" long.

* * * * *